United States Patent [19]

Lanzafame et al.

[11] Patent Number: 4,737,971
[45] Date of Patent: Apr. 12, 1988

[54] SYNCHRONIZATION DETECTION CIRCUIT

[75] Inventors: Christopher Lanzafame, West End; Bryan S. Moffitt, Red Bank, both of N.J.

[73] Assignees: American Telephone and Telegraph Company, New York, N.Y.; AT&T Information Systems Inc., Morristown, N.J.

[21] Appl. No.: 849,259

[22] Filed: Apr. 7, 1986

[51] Int. Cl.[4] .......................................... H04L 7/00
[52] U.S. Cl. ........................................ 375/118; 371/1
[58] Field of Search ............................. 375/118; 371/1

[56] References Cited

U.S. PATENT DOCUMENTS

| | | | |
|---|---|---|---|
| 3,903,371 | 9/1975 | Colton et al. | 370/105 |
| 4,059,825 | 11/1977 | Greene | 375/118 |
| 4,370,648 | 1/1983 | Liang et al. | 340/825.2 |
| 4,429,386 | 1/1984 | Graden | 370/100 |
| 4,471,299 | 9/1984 | Elmis | 324/83 D |
| 4,516,250 | 5/1985 | Grimes | 375/82 |
| 4,528,521 | 7/1985 | Grimes | 331/1 A |
| 4,535,459 | 8/1985 | Hogge, Jr. | 375/80 |
| 4,542,504 | 9/1985 | Moul et al. | 370/100 |
| 4,545,061 | 10/1985 | Hileman | 375/119 |
| 4,592,050 | 5/1986 | Bensadon | 375/107 |

OTHER PUBLICATIONS

F. M. Gardner, "A Cycle-Slip Detector for Phase-Locked Demodulators", Sep. 1977, pp. 251-254, IEEE Transactions on Instrumentation and Measurement, vol. 1M-26, No. 3.

*Primary Examiner*—James J. Groody
*Assistant Examiner*—Michael D. Parker
*Attorney, Agent, or Firm*—David H. Tannenbaum; David R. Padnes

[57] ABSTRACT

There is disclosed an asynchronous pulse catching circuit that, for each edge of the variable frequency input, regardless of duty cycle, will provide a pulse, synchronized to a high speed clock. There is also disclosed a pulse comparison circuit consisting of a state machine that provides slip detection between the variable input frequency and a reference input frequency. The circuit provides separate outputs indicating positive and negative slip.

10 Claims, 4 Drawing Sheets

SYNC DETECTION CIRCUIT

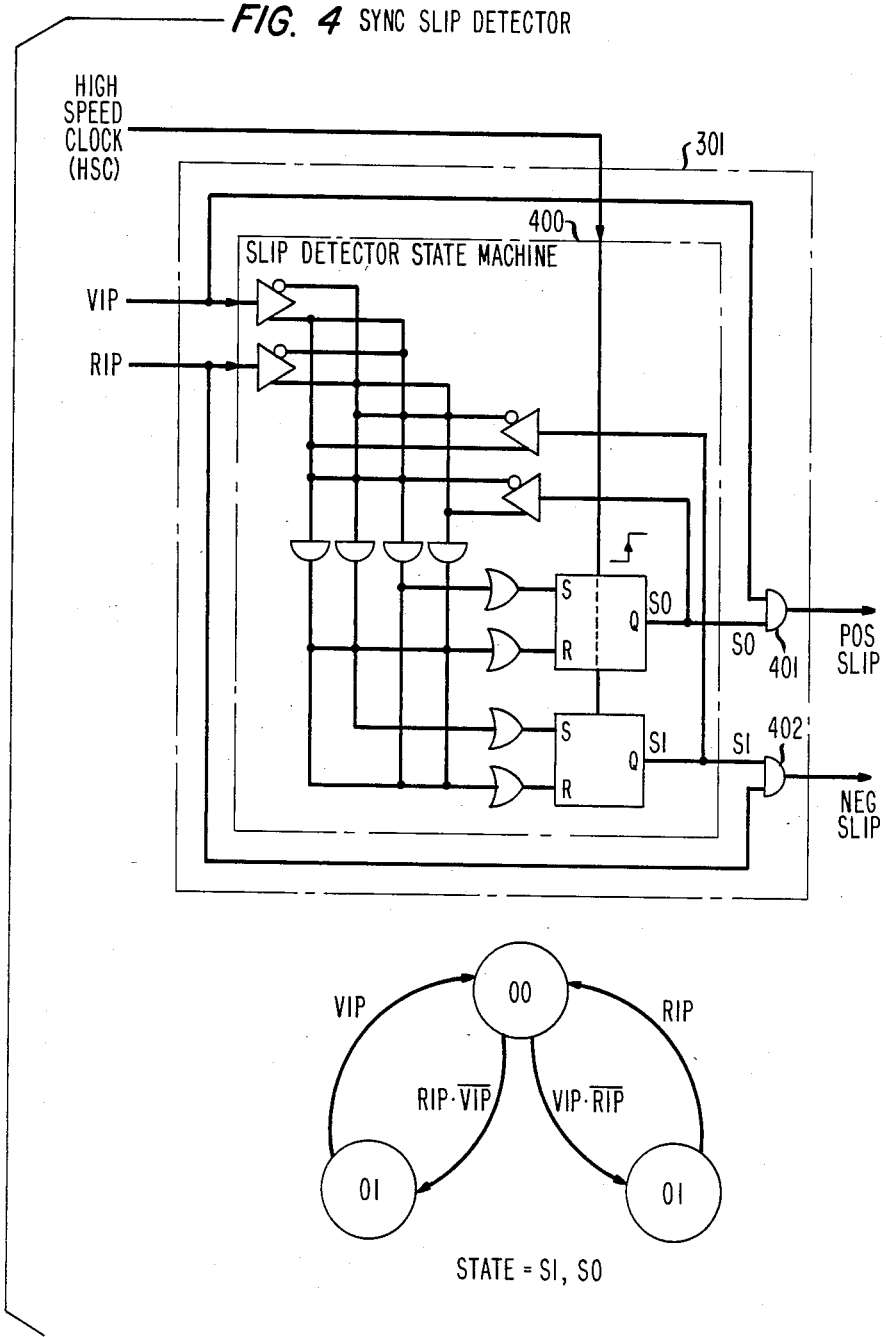
FIG. 4 SYNC SLIP DETECTOR

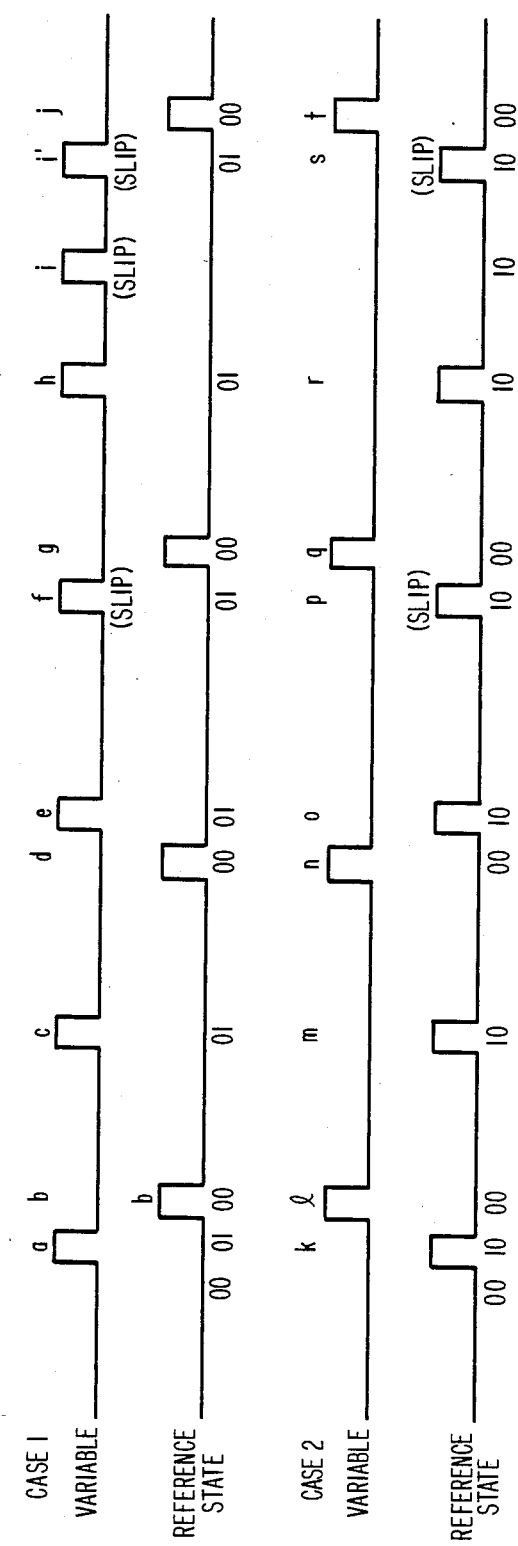
FIG. 5 SYNC SLIP DETECTOR LOGIC TIMING

SYNCHRONIZATION DETECTION CIRCUIT

BACKGROUND OF THE INVENTION

This invention relates to pulse detection circuitry and more particularly to such circuitry for detection of slip conditions between various input signals.

There are many situations in which it is important to know if the digital pulses on a particular signal line are in or out of synchronization with digital pulses on another signal line. Such situations occur in phase-locked loops and digital receivers. This situation also occurs when two circuits are operating independent from, but in parallel to, each other, with both circuits operating from the same master clock, from the same clock frequency or from independent master clocks which are expected to be at the same frequency. Typically, information must be transferred between such circuits and thus it is important that both circuits be in synchronization with each other. Conditions lacking synchronization must be quickly detected so that corrective action can be taken.

The problem is compounded when the signals that are being monitored are asynchronous with respect to each other and may have a wide range of duty cycles or possibly a dynamically varying duty cycle.

Circuits are available to accomplish the desired result; examples being U.S. Pat. Nos. 4,471,299 and 4,516,250 and the circuit discussed in an article entitled "Cycle Slip Detector" by F. M. Gardner in the September 1977 issue of IEEE Transactions on Instrumentation and Measurement (Vol. 1M-26, No. 3). However, such circuits rely on processing the asynchronous signals throughout the detection circuitry. While such circuits are workable, the asynchronous nature of their design poses difficulties in testing and in using VLSI techniques for implementation. This arises because such circuits typically have digital one-shots or delay lines. By comparison with synchronous logic circuits, these components are always more difficult to verify and to generate manufacturing tests. In addition, they are not easily adapted to VLSI implementation. The output of such circuits may also be asynchronous, imposing the same difficulties to further signal processing.

The advantages of predominately synchronous operation are straight forward implementation in VLSI, simplified circuit design, and a simplified manufacturing test.

SUMMARY OF THE INVENTION

We have designed a synchronous slip detector which handles asynchronous inputs. Our circuit processes its input signals in two stages. The first stage converts these signals into signals which are synchronous to a master clock frequency. This conversion is accomplished by a combination of an asynchronous and a synchronous flip flop that remembers a narrow pulse on its input until the next master clock cycle, at which time the corresponding signal is passed through to a second stage of processing. This first stage of signal processing provides a self-contained synchronization function that is small enough to ease the design verification. It can also be operated synchronously to facilitate manufacturing testing.

The second stage of processing is a synchronous slip detector designed as a state machine that serves to keep track of the relative positioning of two respective input pulses. If pulses are received on both inputs simultaneously, then a null condition exists. However, if a pulse arrives on either of the inputs ahead of the pulse on the other input, a "marked" condition exists with respect to that input. If a second pulse arrives on the marked input before a pulse arrives on the other input, a slip indication is given. For each subsequent pulse on the marked input, until a pulse arrives on the unmarked input, a slip indication is provided.

BRIEF DESCRIPTION OF THE DRAWINGS

These and other objects and features, together with the operation and utilization of the present invention, will be more apparent from the illustrative embodiment shown in conjunction with the drawings in which FIG. 1 schematically shows, by way of a block diagram, one embodiment of our synchronization detection circuit.

FIG. 4 discloses one embodiment of a synchronous slip detector logic and state machine with state sequence.

FIG. 5 illustrates a series of waveforms describing the detection of positive and negative slips.

DETAILED DESCRIPTION

Figure 1:
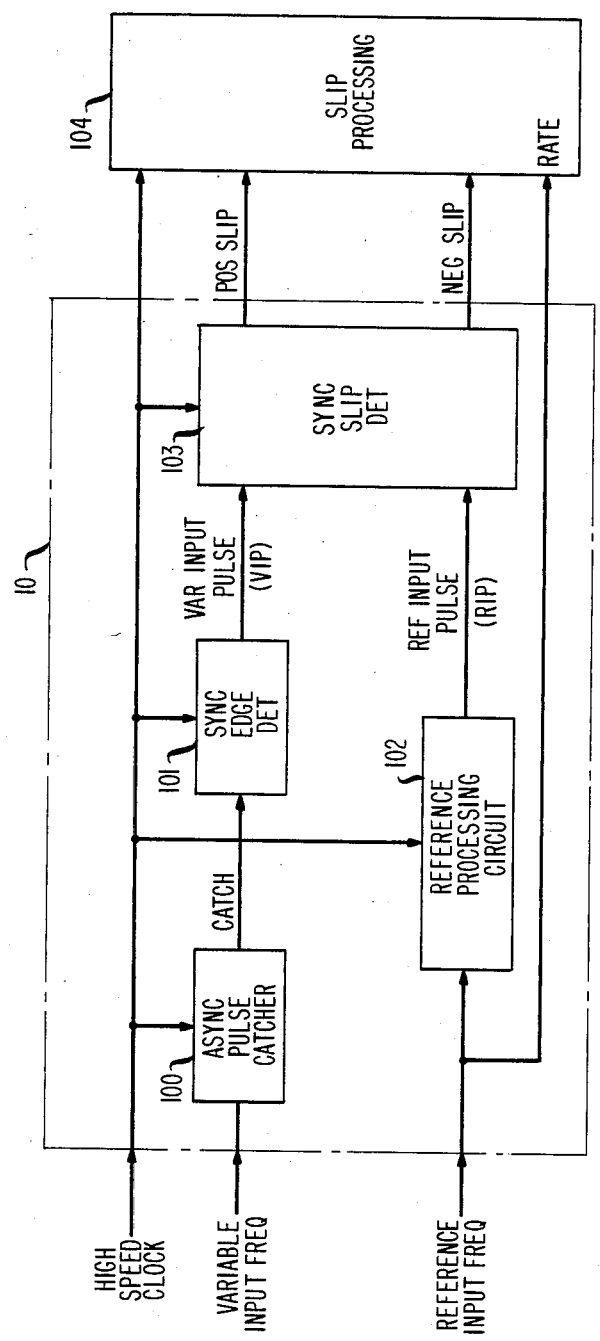

FIG. 1 discloses one embodiment of asynchronous detection circuit 10 including an synchronous pulse catcher 100, synchronous edge detector 101, and asynchronous slip detector 103. In this description, we can assume that the "reference input frequency" is derived from the high speed clock input signal. If this were not the case, then reference processing circuit 102 would be required.

The variable input frequency signal is of lower frequency than the high speed clock signal, although the asynchronous pulse catcher 100, as will be discussed, will compensate for an input pulse width of duration shorter than the period of the high speed clock. Asynchronous pulse catcher 100 produces the signal "catch" whose transitions follow the transitions of the variable input frequency but only during intervals identified by the high speed clock. Synchronous edge detector 101 produces a single high pulse, called "variable input pulse", for every low to high transition of the signal "catch". Synchronous slip detector 103 compares the signal "variable input pulse" with the signal "reference input pulse" to generate the positive and negative slip indications.

The positive and negative slip indications and the reference input frequency would be used as inputs to any slip processing functions. As an example, slip processing circuit 104 may be capable of computing a difference frequency between the variable input signal and the reference input signal by receiving the reference input frequency as a rate input. If the reference input frequency is not synchronous or does not meet the pulse shape requirements of synchronous slip detector 103, reference processing circuit 102 may be needed. This circuit could be the same as the circuits contained within blocks 100 and 101.

Figure 2:
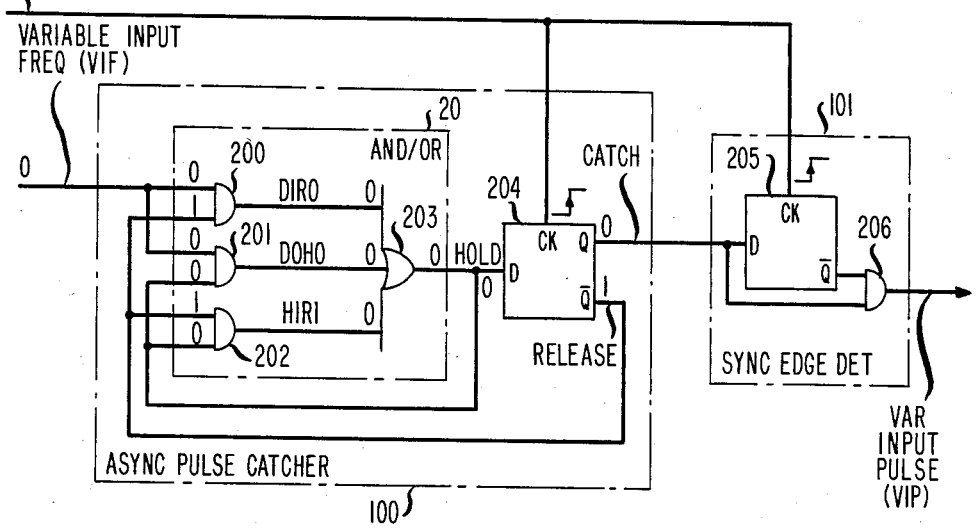
FIG. 2, schematically shows, by way of a block diagram, the detail of one embodiment of an asynchronous pulse catcher and a synchronous edge detector, representing the described first stage of signal processing.

FIG. 2 contains the detail of one embodiment of asynchronous pulse catcher 100 and synchronous edge detector 101 shown in FIG. 1.

AND-OR circuit 20, consisting of gates 200, 201, 202 and 203 with the feedback of the "hold" signal, is an asynchronous, i.e., non-clocked, flip flop that holds a given level of the variable input frequency (VIF) until flip flop 204 catches that level. As the level is caught, the signal on the release line releases the asynchronous flip flop allowing it to hold a new incoming level. In this way the circuit is capable of detecting an input pulse whose duration is shorter than the high speed clock cycle. It should be noted that the circuit would not detect two input pulses prior to a clock signal but this is an invalid condition since it is assumed that the frequency of the input is less than the clock signal. This circuit is therefore bound by frequency, but not by pulse width or pulse position.

The 1's and 0's shown for circuit 20 are the conditions of the various leads in steady state, assuming that high pulses represent the initial active condition. Gate 200 detects a low to high transition of VIF causing its output to go high and the output of gate 203 to also go high. Gate 201 detects a transition of VIF to a 0 level and holds the 0 level until flip flop 204 catches and releases that level on an edge of the high speed clock. Gate 202, in response to any input of gate 203 going high, puts a high on an input of gate 203 to hold the high level until flip flop 204 catches the high level on an edge of the high speed clock.

Synchronous edge detector 101 contains flip flop 205 and gate 206. Flip flop 205 generates a delayed and inverted "catch" signal. Gate 206 combines the two signals to generate the "variable input pulse" (VIP) signal which is a pulse measuring one clock period wide for every low to high transition of the signal "catch". The signal "catch" resembles the signal VIF but is synchronous to the high speed clock pulse. Any narrow input pulses are thus stretched out to one period of the high speed clock. The signal VIP has the same frequency as VIF but has a duty cycle of only a single high speed clock cycle.

Figure 3:
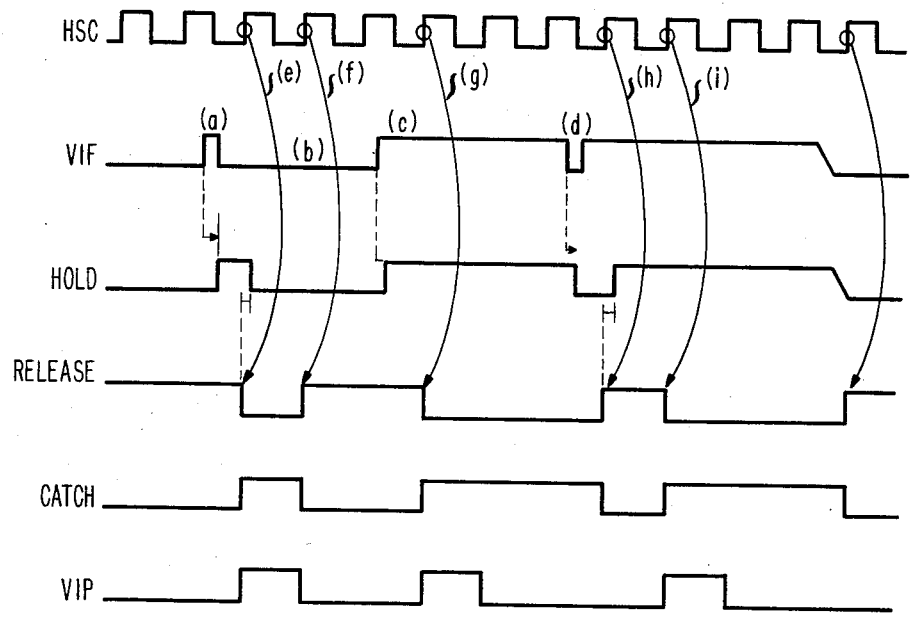
FIG. 3 illustrates a series of waveforms describing the timing of the asynchronous pulse catcher and synchronous edge detector of FIG. 2.

FIG. 3 illustrates waveforms of signal timing of the circuit of FIG. 2.

HSC is the high speed clock and the rising edge of HSC is used as the synchronous clocking edge. Initially VIF has been low and the signals, hold, catch and VIP will be low.

Four situations are examined, a narrow high pulse (a), a long low period (b), a long high period (c) and a narrow low pulse (d).

The narrow high pulse (a) of VIF is detected and held by the hold signal, as discussed above (via gates 200 and 202), until catch goes high on the first following HSC high edge (e). On the next HSC high edge (f) catch follows VIF back to the low level. Catch then remains in this low (b) level while VIF remains low.

Catch follows VIF going high (c) and remains in this high level while VIF remains high. The narrow low pulse (d) of VIF is detected (via gate 201) and held by the hold signal until catch goes low on the first following HSC high edge (h). On the next HSC high edge (i) catch follows VIF back to the high level.

VIP provides a single high pulse for every low to high transition of catch. Thus, since VIF made three low to high transitions, (a), (c) and (d), so did VIP. As can be seen VIP has the same frequency as catch but has a duty cycle of only a single HSC period. The result is a synchronized high pulse on VIP for every rising edge of VIF, regardless of pulsewidth or frequency of VIF.

FIG. 4 is a slip detector composed of a clocked state machine 400, and a positive slip gate 401 and a negative slip gate 402. The states and state transitions are as shown in the state diagram and are controlled by circuitry, such as that shown.

The purpose of the state machine is to count high speed clock periods which have only the VIP input high or which have only the RIP input high. This function is then used by gates 401 and 402 to determine when positive and negative slip conditions have occurred.

In a typical no-slip condition, the state is 00 and remains at 00 if the VIP and RIP inputs (from FIG. 1) are low. If the RIP and VIP inputs both go high together, the state remains at 00 indicating that VIP and RIP are tracking each other. If only VIP goes high, the state changes to 01 and remains at 01 until RIP goes high. This condition does not constitute a slip but does indicate that a signal on input VIP came ahead of a signal on input RIP. If, while the state remains at 01, input VIP goes high again, gate 401 will indicate a positive slip during this second VIP high pulse. This is defined as a positive slip condition because input VIP has had two high pulses without a corresponding RIP high pulse. Further VIP input pulses will result in additional positive slip indications. This condition will continue until the state machine is reset to 00 by a pulse on the RIP input.

Negative slip detection, via gate 402, operates in a symmetrical fashion. If a high RIP input pulse is received, the state changes to 10 and remains at 10 until a VIP pulse is received. Again, this does not constitute a slip but does indicate that a pulse on input RIP came ahead of a pulse on input VIP.

If a second pulse occurs on input RIP while in state 10, gate 402 will indicate a negative slip condition.

FIG. 5 illustrates two cases where a series of waveforms describing the detection of positive and negative slips are examined:

Case 1 illustrates the condition created when the variable frequency is at a faster rate than the reference frequency. For this case, three slips in the positive direction occur since the reference frequency is slower than the variable frequency. At point f, the first positive slip occurs. At point i, the second positive slip occurs.

The pulse at point h is not a slip condition. The next two pulses, i and i' are ahead of the next reference pulse j, thereby registering two positive slip conditions. As can be seen, after a slip has occurred, a pulse from the direction opposite the slip will bring the state machine back to even.

Case 2 illustrates the condition created when the reference frequency is at a faster rate than the variable frequency. As shown, slips occur in the negative direction. The first negative slip occurs at point p. The state machine is reset by pulse q and two pulses (r and s) arrive before another variable pulse t, thereby resulting in the second slip indication.

CONCLUSION

While the circuit has been described in terms of digital binary signal levels, it is understood that any asynchronous signals of any composition, including multi-levels or multi-states, could be processed in the manner discussed herein without departing from the spirit and scope of the invention. Also, it will be obvious that the reference input frequency and reference processing circuit may be either the high speed clock signal or a derivative thereof or may be a second independent signal input. The clock signal itself may be internally derived or received from an exterior source.

What is claimed is:

1. A circuit for monitoring signals and for providing indications of the slip conditions of said signals, said circuit comprising
   means responsive to at least one asynchronous input signal and a clock signal for converting each asynchronous input signal to an associated signal synchronous with said clock signal, each asynchronous input signal having a frequency less than that of said clock signal and having a duty cycle and phase angle independent of said clock signal, and
   means for monitoring each said associated signal and said clock signal and for providing indications of any slip condition of said monitored signals.

2. The invention set forth in claim 1 wherein each said asynchronous input signal has transitions between levels and wherein said converting means includes means for detecting any said signal transition to a new level and for holding said detected new level until the next cycle of said clock signal.

3. The invention set forth in claim 2 wherein said detecting means includes a non-clocked flip flop circuit.

4. The invention set forth in claim 1 wherein each said asynchronous input signal has transitions between levels and wherein said slip indication providing means includes memory means operable to maintain a transition history of said monitored signals and to provide output indications dependent upon the state of the circuit as established by said transition history.

5. The invention set forth in claim 1 wherein said circuit is also responsive to at least one second input signal, each said second input signal being synchronized with said clock signal, and wherein said monitoring means is arranged to monitor each second input signal and to provide indications of the slip condition of said monitored signals.

6. The invention set forth in claim 1 wherein said circuit is also responsive to at least one second input signal each of a frequency less than said clock frequency and having a duty cycle and phase angle independent and asynchronous of said clock signal, said circuit further comprising
   second conversion means for converting each second input signal received on said second input into an associated second signal synchronous with said clock signal, and
   wherein said monitoring means is arranged to monitor each associated second signal and to provide indications of the slip condition of said monitored signals.

7. A circuit for monitoring digital signals on at least two inputs and for providing indications of the slip conditions of said signals, said circuit comprising
   a clock signal source for providing a clock signal having a certain frequency,
   at least one first asynchronous digital signal input each receiving a first input signal of a frequency less than said clock frequency and having a duty cycle and phase angle independent and asynchronous of said clock signal,
   first conversion means connected to said signal input for converting any first asynchronous input signal into a first associated signal synchronized with said clock signal,
   at least one second signal input each arranged to receive a second signal of a frequency less than said clock frequency and having a duty cycle and phase angle independent and asynchronous of said clock signal,
   second conversion means for converting each second signal received on said second input into an associated second signal synchronized with said clock signal,
   means timed by said clock signal for monitoring each first associated signal and each second associated signal and for providing indications of the slip condition of said monitored signals.

8. The invention set forth in claim 7 wherein said asynchronous first and second signals have transitions between levels and wherein said first and second converting means each includes means for detecting any signal transition to a new level on said asynchronous first and second signal inputs and for holding said detected new level until the next cycle of said clock signal.

9. A circuit for monitoring digital signals on at least two inputs and for providing indications of the slip conditions of said signals, said circuit comprising
   a clock signal source for providing a clock signal having a certain frequency,
   at least one asynchronous digital signal input each receiving an input signal of a frequency less than said clock frequency and having a duty cycle and phase angle independent and asynchronous of said clock signal,
   means connected to said signal input for converting each received asynchronous input signal into an associated signal synchronized with said clock signal,
   a second signal input arranged to receive a second signal synchronized with said clock signal,
   means timed by said clock signal for monitoring each associated signal and said second signal and for providing indications of the slip condition of said monitored signal.

10. The invention set forth in claim 9 wherein any received asynchronous input signal has transitions between levels and wherein said first converting means includes means for detecting any signal transition to a new level on said asynchronous signal input and for holding said detected new level until the next cycle of said clock signal.

* * * * *